United States Patent [19]

Abe

[11] 3,870,409

[45] Mar. 11, 1975

[54] STORAGE DEVICE FOR INFORMATION RECORDING SHEETS

[75] Inventor: Takeshi Abe, Yokohama, Japan

[73] Assignee: Ricoh Co. Ltd., Tokyo, Japan

[22] Filed: Jan. 23, 1973

[21] Appl. No.: 326,106

[30] Foreign Application Priority Data

| | | |
|---|---|---|
| Jan. 25, 1972 | Japan | 47-9235 |
| Jan. 25, 1972 | Japan | 47-9238 |

[52] U.S. Cl. ........................ 353/27, 353/118, 271/9, 271/64

[51] Int. Cl. .......................................... G03b 23/08

[58] Field of Search ......... 353/25, 26, 27, 120, 108, 353/109, 118; 209/74 R; 214/8.5 SS; 40/106.1; 271/64, 9, 18

[56] References Cited

UNITED STATES PATENTS

| | | | |
|---|---|---|---|
| 1,072,861 | 9/1913 | Koike | 353/109 |
| 3,124,260 | 3/1964 | Tidball | 271/18 A |
| 3,687,303 | 8/1972 | Kramer | 214/8.5 SS |
| 3,721,435 | 3/1973 | Zanders | 271/64 |

OTHER PUBLICATIONS

"Edge Feed Transport System for Document Sorting and Stacking" – M. Jakubowski; IBM Doc. Vol. 13, No. 11 Apr. 1971.

*Primary Examiner*—Richard E. Aegerter
*Assistant Examiner*—A. J. Mirabito
*Attorney, Agent, or Firm*—Cooper, Dunham, Clark, Griffin & Moran

[57] ABSTRACT

A storage device for rectangularly shaped information recording sheets comprising an elongated support strip which bends in bellows-like fashion between an extended position in which at least a portion of it is straight and a contracted position in which it has a zig-zag longitudinal section with alternating valleys and crests. When the support strip is in its contracted position, it occupies minimal space because the information cards mounted on it are like the pages of a closed book. When a selected pair of crests of the support strip are pulled apart longitudinally, the section of strip between these selected crests is straightened out to expose the information recording sheets mounted between these selected crests. The exposed information recording sheets may be projected on a suitable screen by a suitable optical projector indexed with the exposed sheets. Different embodiments of support strips and of means for mounting information recording sheets thereon are disclosed.

17 Claims, 16 Drawing Figures

STORAGE DEVICE FOR INFORMATION RECORDING SHEETS

BACKGROUND OF THE INVENTION

The invention relates to storage devices for information recording sheets such as microfiches, punched cards and the like.

There are many prior art devices for storing and retrieving information recording sheets. The common goal of such devices is to provide for storing such information sheets in a minimum of space and to provide for conveniently retrieving selected sheets. In one prior art device of this type, a stack of information sheets is stored in a suitable case and selected sheets are retrieved from the stack by utilizing sensing means provided on each sheet. In another prior art device of this type, information sheets provided with sensing means are arranged radially on a rotating disc and selected sheets are moved radially away from the disc to be projected on a screen by a suitable projecting device. One disadvantage of the prior art devices discussed above is that adjacent sheets are stored in contact with each other and each selected sheet rubs against the adjacent sheets when pulled out for display. This results in relatively short life of the information sheets due to friction damage. It is desirable therefor to provide a storage device which prevents such damage within the framework of the desirable goals of minimum storage space for a given number of information sheets and convenient retrieval of selected sheets.

SUMMARY OF THE INVENTION

An object of the invention is to provide a storage device for information sheets which stores information sheets in a minimal space and provides for efficient retrieval of selected sheets without physical damage thereto.

The device according to the invention comprises an elongated support strip bent in bellows-life fashion to have a zigzag longitudinal section with alternately valleys and crests. Information recording sheets are mounted on the strip between adjacent pairs of valleys and crests. Support pins are secured to each crest and are slidably supported for longitudinal movement by a guide means. When all the support pins are close to each other, the support strip is in its contracted position and stores a given number of information sheets in minimum space. When a selected pair of support pins are pulled apart longitudinally, the section of strip between the selected pins is stretched out to an extended position to expose the information sheets mounted thereon. The exposed information sheets may be projected on a suitable screen.

In one embodiment of the invented device, the support strip is two parallel longitudinally extending thin strips bridged by a row of information recording sheets. One of the transverse ends of each sheet is mounted on one strip and the other transverse end of the same sheet is mounted on the other strip. Alternately, one longitudinal end of each sheet is secured to a strip whose transverse ends bridge the two strips and are secured to the strips. In another embodiment the support strip has a row of windows each supporting an information sheet. Alternate information sheets may be mounted on alternate sides of the support strip, so that when the support strip is in its contracted position, adjacent information sheets are not in physical contact with each other. An alternate means for mounting information sheets to the support strip comprises a plurality of clips each secured to a valley of the support strip and carrying an information sheet such that the sheet is perpendicular to the longitudinal dimension of the strip when the strip is in its extended position.

DETAILED DESCRIPTION

Figure 1:
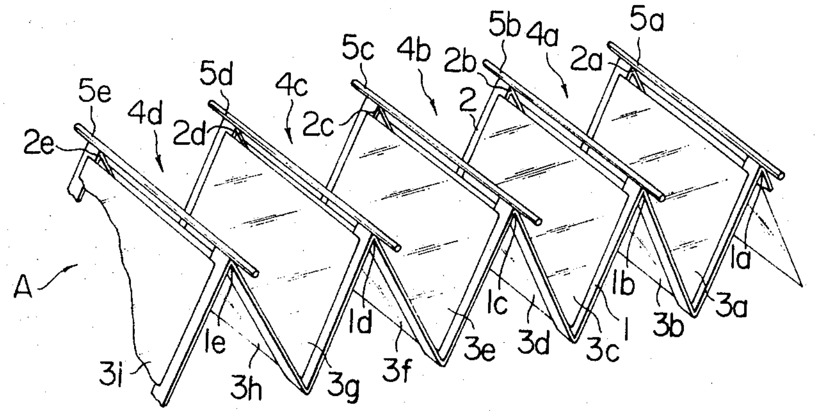
FIG. 1 is a perspective view of a partly contracted position of a support strip for information sheets forming one embodiment of the invention.
Figure 2:
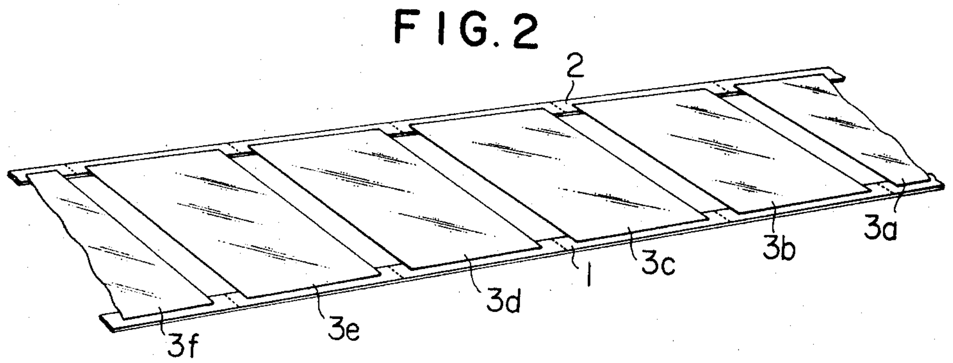
FIG. 2 is a perspective view of the support strip of FIG. 1 in an extended position.

Referring to FIGS. 1 and 2, rectangularly shaped information recording sheets 3*a*, 3*b*, . . . 3*f* are mounted in a longitudinal row on a support means comprising a pair of longitudinally extending parallel strips 1 and 2 which are bridged by the transversely extending information recording sheets. The support strips 1 and 2 can be bent in a bellows-life fashion, as illustrated in the perspective view of FIG. 1, to form a plurality of valleys 3*a*, 3*b*, 3*c* and 3*d* alternating with a plurality of crests 1*a*, 1*b*, 1*c*, 1*d* and 1*e*.

Figure 3:
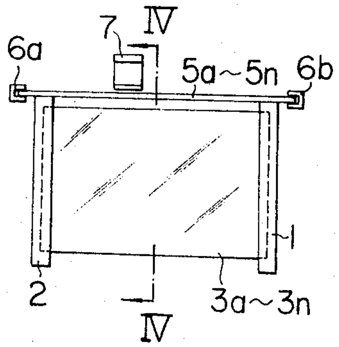
FIG. 3 is a front view of the embodiment shown in FIG. 1, as seen in the direction of the Arrow in FIG. 1.
Figure 4:
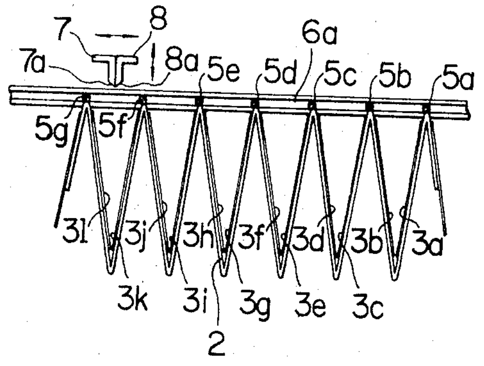
FIG. 4 is a longitudinal sectional view taken along line IV—IV of FIG. 3.

Referring to FIGS. 1, 3 and 4, support pins 5*a*, 5*b*, . . . 5*e* are secured to the crests 1*a*, 1*b*, . . . 1*e* respectively and have transversely opposite ends extending transversely outwardly of the support strips 1 and 2. The transversely opposite ends of the support pins 5*a* through 5*n* (where *n* is the number of support pins) fit slidably within a pair of guide channels 6*a* and 6*b* whose open sides face each other.

Referring to FIGS. 3 and 4, a selected pair of adjacent support pins, e.g., the supporting pins 5*f* and 5*g*, may be moved apart longitudinally by means of a pair of support strip shifting members 7 and 8 which have downwardly facing projectionns 7*a* and 8*a* insertable between a pair of adjacent support pins.

Figure 5:
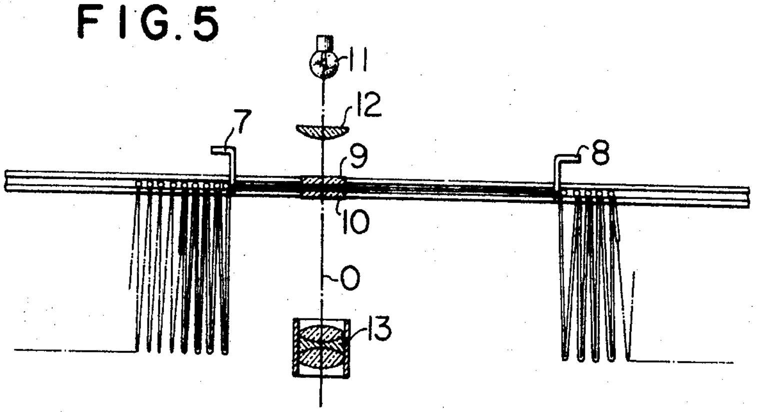
FIG. 5 is a view similar to FIG. 4 but showing a projecting optical device.

Referring to FIG. 5, when a pair of adjacent support pins has been suitably moved longitudinally apart by means of the shifting members 7 and 8, the portion of the support strips 1 and 2 extending therebetween is straightened out to expose the information sheets mounted thereon to a means for projecting the selected information sheets onto a suitable screen. The projecting means includes a light source 11 generating a beam of light passing through a condensor lens 12 and through a pair of contact glas plates 9 and 10 flanking the exposed selected information sheets, to project the image thereof onto a suitable screen (not shown) through a projection lens 13.

Referring to FIGS. 1 through 5, it is noted that the support means comprising the strips 1 and 2, with the information sheets mounted thereon has a contracted position, as suggested by FIGS. 4 and 5, in which the information sheets are almost parallel to each other and the support pins are closely spaced from each other. In this contracted position, the information cards are stored in a minimal amount of space. The support means comprising the support strips 1 and 2 also has an extended position, in which the strips 1 and 2 are substantially straight, as illustrated in FIG. 2. In this extended position, all information sheets are exposed and are arranged in a longitudinal row. When two adjacent support pins are moved away from each other longitudinally, as suggested by FIG. 5, the portion of the support means therebetween is in the extended position, while the remaining portion of the support strips is in the contracted position. It is noted that a selected pair of nonadjacent support pins may be moved away from each other longitudinally, to thereby stretch out to the extended position the intermediate section of the support strips 1 and 2.

In the embodiment of the invention illustrated in FIGS. 1 through 5, the information recording sheets are mounted directly on the same side of the strips 1 and 2, and are secured thereto, for example, by means of a suitable adhesive.

Figure 6:
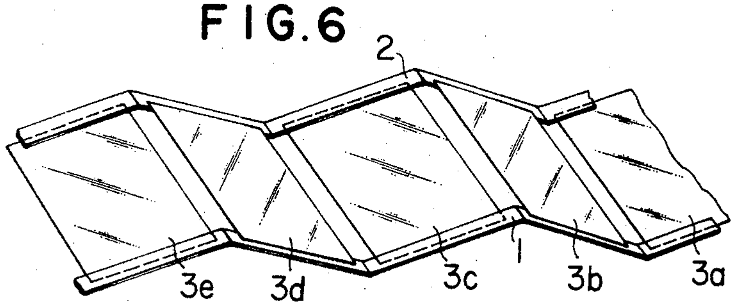
FIG. 6 is a perspective view similar to FIG. 1 but showing alternating information sheets mounted on alternating sides of the support strip.

In order to prevent possible rubbing between facing information sheets when the strips 1 and 2 are in their contracted position, alternate information sheets 3*a*, 3*b*, etc. may be mounted on opposite sides of the strips 1 and 2, as illustrated in FIG. 6. With the embodiment illustrated in FIG. 6, there is no physical contact between adjacent information sheets when the strips 1 and 2 are folded to their contracted position.

Figures 7, 8, 9:
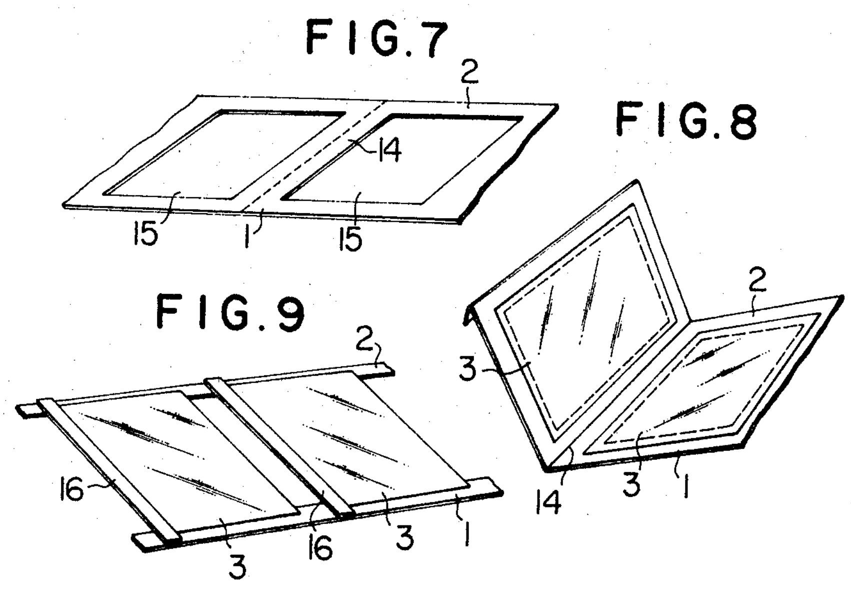
FIG. 7 is a partial perspective view of a support strip forming another embodiment of the invention.
FIG. 8 is a partial perspective view showing the support strip of FIG. 7 in a partly contracted position.
FIG. 9 is a partial perspective view showing an alternate manner of mounting information sheets on the support strip.

An alternative embodiment of the support means discussed in connection with FIGS. 1 through 6, is illustrated in FIG. 7 and comprises support strips 1 and 2 similar to the correspondingly numbered support strips of FIGS. 1 through 6 which are bridged, however, by means of transversely extending integral connectors 14, to thereby form a row of windows 15. Individual information recording sheets 3 may then be mounted at each window 15 in the manner illustrated at FIG. 8. The information sheets 3 may be mounted at the windows 15 in any suitable manner, such as by affixing an information sheet over a window 15 by means of an adhesive, or by mounting an information sheet in a manner similar to that used for mounting picture slides for projectors, or in any other suitable manner.

An alternate way of mounting the information recording sheets 3 onto the support strips 1 and 2 is illustrated in FIg. 9, and involves the use of transversely extending clips 16. One of the transverse ends of each clip 16 is secured to the strip 1 by means such as a suitable adhesive, and the transversely opposite end of the same clip 16 is similarly secured to the support strip 2. It is noted that the clips 16 may be channel-shaped in a section parallel to the strips 1 and 2, so that when the support strips 1 and 2 are bent in a zigzag fashion to the contracted position, adjacent clips 16 may abut each other, but the information recording sheets 3 carried thereby are not in physical contact with each other, and there is no possibility of deterioration of the information sheets 3 because of rubbing against adjacent sheets.

Figures 10, 11, 12, 13:
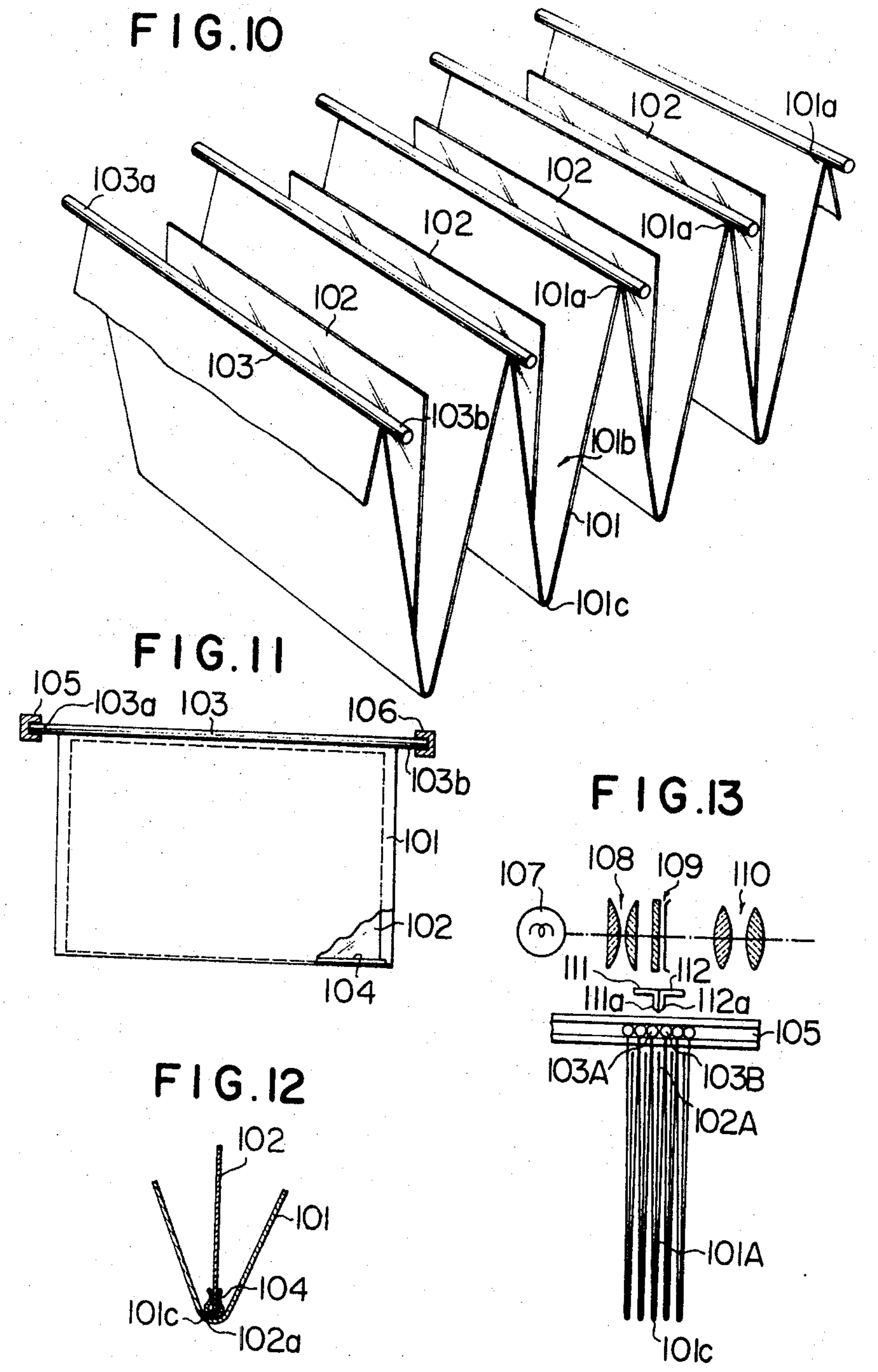
FIG. 10 is a partial perspective view of a support strip forming a still another embodiment of the invention.
FIG. 11 is a front view of the embodiment shown in FIG. 10 and additionally shows guide rails.
FIG. 12 is a fragmentary side sectional view of the embodiment shown in FIG. 10.
FIG. 13 is a partial sectional side view of the embodiment shown in FIG. 10 in conjunction with means for extending the support strip and optical projecting means.

An alternate embodiment of support means is shown in FIG. 10 and comprises a wide strip 101 which can be bent in a manner similar to that of bending the strips 1 and 2 discussed above to form crests 101*a* and valleys 101*b*, with the bottoms of the valleys 101*b* identified by the reference numeral 101*c*.

Referring to FIGS. 10 and 11, support pins 103 are suitably secured to the crests 101*a* of the support strip 101, and the transverse ends of the support pins 103 are slidably supported within a pair of opposing longitudinally extending guide channels 105 and 106. The left-hand side end 103*a* (FIG. 11) of the pin 103 fits within the guide channel 105, while the right-hand end 103*b* fits within the guide channel 106.

Referring to FIG. 12, a holder 104, which is channel-shaped in the longitudinal cross-section illustrated in FIG. 12, is suitably secured to the bottom 101*c* of each valley 101*b*. The opening of the channel section 104 faces upwardly, and the lower end 102*a* of an information recording sheet 102 is inserted therein, such that it is firmly held within the channel section 104.

The information recording sheets 102 remain substantially perpendicular to the plane of the guide channel 105 and 106. In order to expose a selected information recording sheet 102, the pair of support pins 103 adjacent to it are moved apart longitudinally, such that the intermediate section of the supporting strip 101 is stretched out to its extended position, and the selected information recording sheet 102 is moved upwardly above the level of the nonselected information recording sheets 102.

Figures 14, 15, 16:
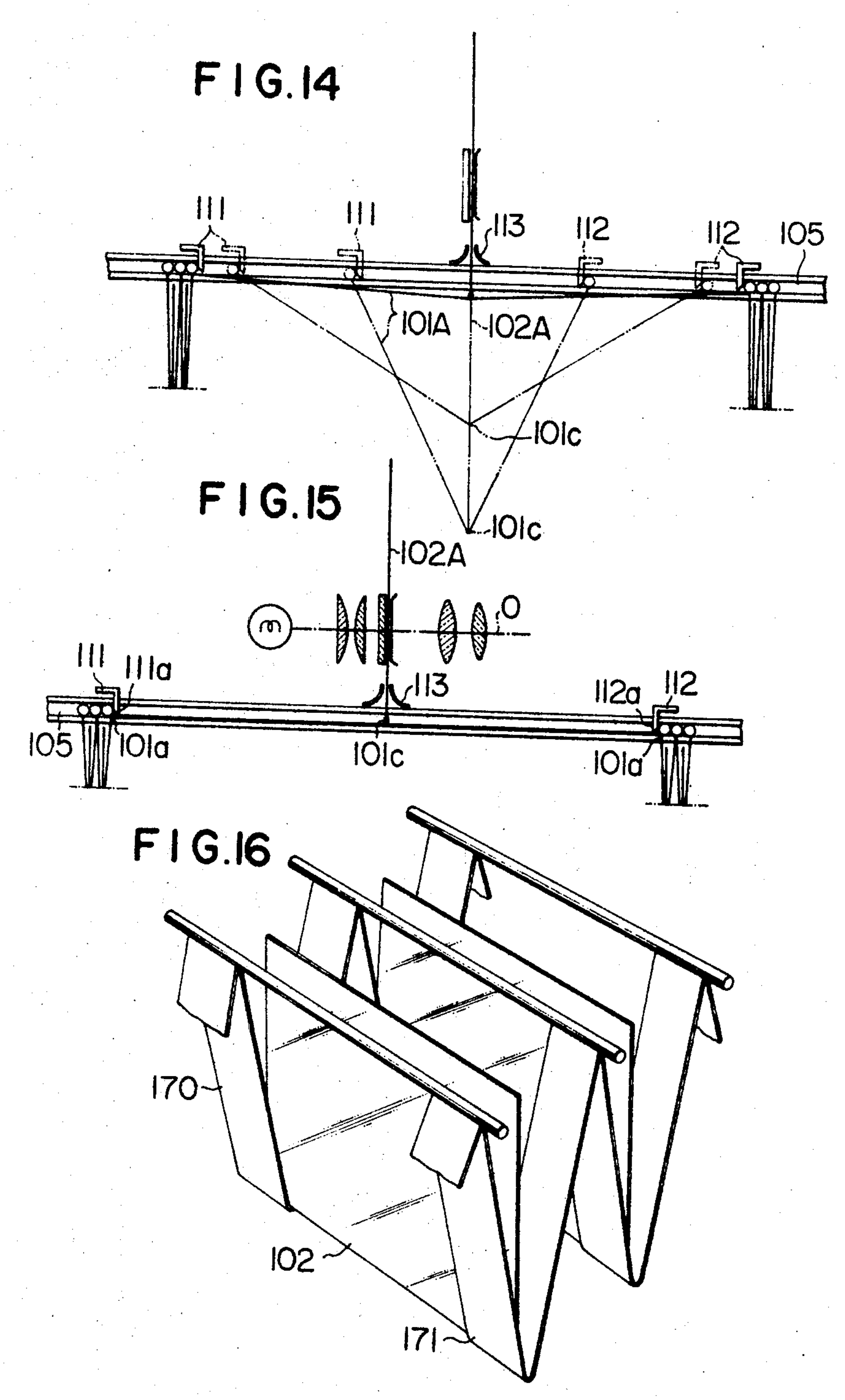
FIG. 14 is a partial side sectional view explaining the manner of operation of the embodiment shown in FIG. 13.
FIG. 15 is a view similar to FIG. 14 and shows a section of the support strip in its extended position.
FIG. 16 is a perspective view showing a still different embodiment of a support strip.

Referring to FIGS. 13, 14 and 15, FIG. 13 illustrates a support strip 101 which is in the contracted position, with the support pins 103 brought closely together. FIG. 13 also illustrates an optical projector for projecting the information on selected information recording sheets onto a suitable screen (not shown). The projecting device includes a light source 107 which generates a light beam passing through a condensor lens 108 and passing through a contact glass 109 and a projector lens 110. FIG. 13 also illustrates a pair of microfiche shifting members 111 and 112 disposed above the guide channels 105 and 106 and having downwardly extending projections 111*a* and 112*a* respectively. When the information sheets 102A is indexed with the shifting members 111 and 112, the shifting members are brought down such that their projections 111*a* and 112*a* engage the support pins 103A and 103B which are adjacent the selected information recording sheet 102A, and then the shifting members 111 and 112 are moved longitudinally apart to separate the engaged support pins, as illustrated in FIG. 14.

Referring to FIGS. 14 and 15, as the shifting members 111 and 112 are moved away from each other longitudinally, the selected information recording sheet 102A moves up, while remaining perpendicular to the plane of the guide channels 105 and 106, and its leading edge goes through the contact glass 109, until the portion of the strip 101 which is intermediate the selected support pins 103A and 103B is stretched out to its extended position, as shown in FIG. 15.

A support strip which is similar in function to the support strip 101 discussed in connection with FIGS. 10 through 15, but is different in construction is illustrated in FIG. 16. The support strip in FIG. 16 comprises a pair of narrow strips 170 and 171 which are parallel to each other and which correspond in function and location to the transverse margins of the support strip 101 of FIGS. 10 through 15. Information sheets 102 are mounted on the strips 170 and 171 as the information sheets 102 are mounted on the strip 101. That is, each of the sheets 102 is mounted in a channel 104 (see FIG. 12) and the channel 104 is in turn mounted onto the strips 170 and 171.

Referring to FIGS. 4 and 5, an information sheet is selected for display and moved to a display position by means of a search device (not shown) which causes relative movement between the support pins 5 and the shifting members 7 and 8. For example, the search device may index the shifting members 7 and 8 with a desired information sheet, so that the shifting members 7 and 8 may then be brought downwardly until their lower ends *7a* and *8a* are inserted between the support pins adjacent the desired information sheet. The shifting members 7 and 8 may then be moved by the search device longitudinally away from each other until the intermediate section of the support strips 1 and 2 is in its extended position. The search device may then index the shifting members 7 and 8 relative to the projection device shown in FIG. 5 such that the information of a selected portion of the selected information sheet 3 is projected on a suitable screen.

Referring to FIGS. 13 through 15, a similar search device (not shown) operates the shifting members 111 and 112 to index a desired information sheet 102 with the projection device shown in FIG. 13 and to move the selected information sheet upwardly so that the information thereon may be selectively displayed on a suitable screen. It is noted, particularly in connection with FIG. 14, that selected portions of the selected information sheet 102 may be displayed simply by selecting the relative positions of the shifting members 111 and 112. Thus, when the shifting members 111 and 112 are pulled apart as much as possible, the lowermost portion of the selected information sheet 102 may be displayed, while a progressively higher portion of the information sheet 102 may be displayed when the shifting members 111 and 112 are brought progressively closer to each other.

I claim:

1. A storage device for information recording sheets, comprising: information recording sheets support means capable of being bent in zigzag fashion and movable in a bellows-like fashion between an extended position and a contracted position to form crests and valleys, a number of support pins each mounted on one of the crests formed in said information recording sheets support means bent in zigzag fashion, a pair of guide channels for slidably supporting opposite ends of said support pins and for guiding the pins in their movements, information recording sheets holding portions provided in said information recording sheets support means, means for moving any selected pair of adjacent support pins apart along the guide channels to thereby extend and straighten the portion of the support means disposed between the last recited pair of support pins while maintaining all other adjacent pairs of support pins close to each other, and means for selectively projecting optically the information on any information recording sheet held by the holding portions of the extended portion of the support means between the moved apart support pins, said moving means comprising a pair of shifting members insertable between a pair of adjacent pins and moveable apart to move apart the last recited pair of pins.

2. A device as set forth in claim 1 wherein said information recording sheets support means comprises a pair of strips parallel to each other, each strip having a pair of opposite surfaces.

3. A device as set forth in claim 2 wherein information recording sheets are mounted alternately on the opposite surfaces of said information recording sheets support means.

4. A device as set forth in claim 1 wherein said information recording sheets support means comprises a strip formed therein with a number of windows each for mounting therein an information recording sheet.

5. A device as set forth in claim 4 wherein said information recording sheets are mounted alternately on opposite sides of the windows formed in said information recording sheets support means.

6. A device as in claim 1 wherein the projecting means generates a projecting beam transverse to the extended section of the support means disposed between the moved apart pair of support pins.

7. A device as in claim 1 wherein the projecting means generates a projecting beam substantially parallel to the extended section of the support means disposed between the moved apart pair of pins.

8. A storage device for information recording sheets, comprising information recording sheets support means capable of being bent in zigzag fashion and movable in a bellows-like fashion between an extended position and a contracted position to form crests and valleys, a number of support pins each mounted on one of the crests formed in said information recording sheets support means bent in zigzag fashion, a pair of guide channels for slidably supporting opposite ends of said support pins and for guiding the pins in their movements, information recording sheets holding portions provided in said information recording sheets support means, means for moving any selected pair of adjacent support pins apart along the guide channels to thereby extend and straighten the portion of the support means disposed between the last recited pair of support pins while maintaining all other adjacent pairs of support pins close to each other, and means for selectively projecting optically the information on any information recording sheet held by the holding portions of the extended portion of the support means between the moved apart support pins, wherein means for fixing and holding a lower end portion of each information recording sheet are provided in each valley formed in said information recording sheets support means bent in zigzag fashion.

9. A storage device for information recording sheets, comprising:

elongated support means bendable in a bellows-like fashion at a plurality of longitudinally spaced location to move between an extended position in which at least a portion of said means is substantially straight and a contracted position in which said means zigzags in longitudinal section to form alternating crests and valleys;

means for securing information recording cards between crests and valleys of said support means;

a plurality of support pins each secured to a crest of the support means;

guide means supporting said pins for slidable longitudinal movement; and means insertable between any selected pair of adjacent pins, without substantially moving any other pins, and moveable to move the selected pairs of adjacent support pins longitudinally away from each other, to thereby move at least a selected portion of said support means to its extended position.

10. A storage device as in claim 9 wherein the support means comprises a pair of parallel longitudinally extending strips bridged by tranversely extending information recording sheets secured to each strip.

11. A storage device as in claim 10 wherein said securing means comprises a plurality of clips extending transversely between said longitudinally extending strips, with each clip having its transversely spaced ends secured to said strips, and with each clip secured to one longitudinal end of an information recording sheet to support that sheet in a position in which the sheet bridges the strips, each clip disposed at a valley of the support means.

12. A storage device as in claim 10 including supporting pins extending from each of said strips.

13. A storage device as in claim 9 wherein said securing means comprises a plurality of clips, each secured to a location of the support means which becomes a valley thereof when the support means is in its contracted position, with each clip supporting an information recording sheet extending therefrom toward the adjacent crest when the support means is in its contracted position, and extending transversely of the support means when the support means is in its extended position.

14. A storage device as in claim 9 wherein the support means include means defining a longitudinal row of windows through said support means, with said windows being aligned with information recording sheets secured to the support means.

15. A storage device as in claim 14 wherein longitudinally alternating information recording sheets are secured to alternating sides of said support means to thereby prevent direct contact between adjacent information recording sheets when the support means is in its contracted position.

16. A storage device as in claim 9 wherein the projecting means comprises means for generating a projecting beam transverse to the extended portion of the support means disposed between the moved apart pair of pins.

17. A storage device as in claim 9 wherein the projecting means comprises means for generating a projection beam substantially parallel to the extended portion of the support means disposed between the moved apart pair of pins.

* * * * *